May 14, 1968 R. L. MURRAY 3,383,123
LINE PRESSURE RESPONSIVE SAFETY COUPLING
Filed Oct. 23, 1965
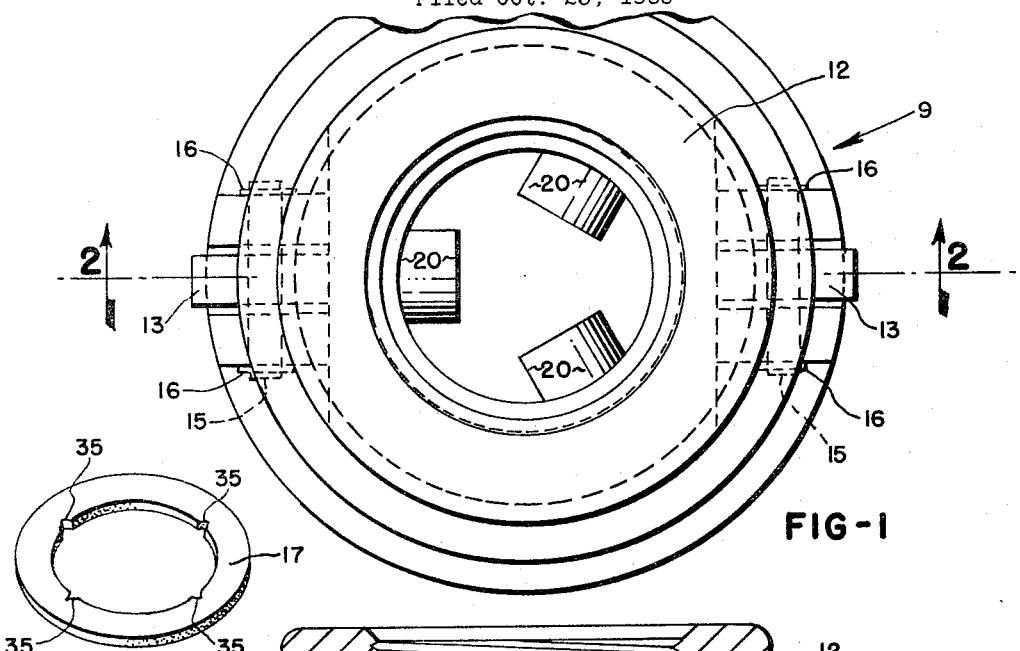
FIG-1
FIG-3
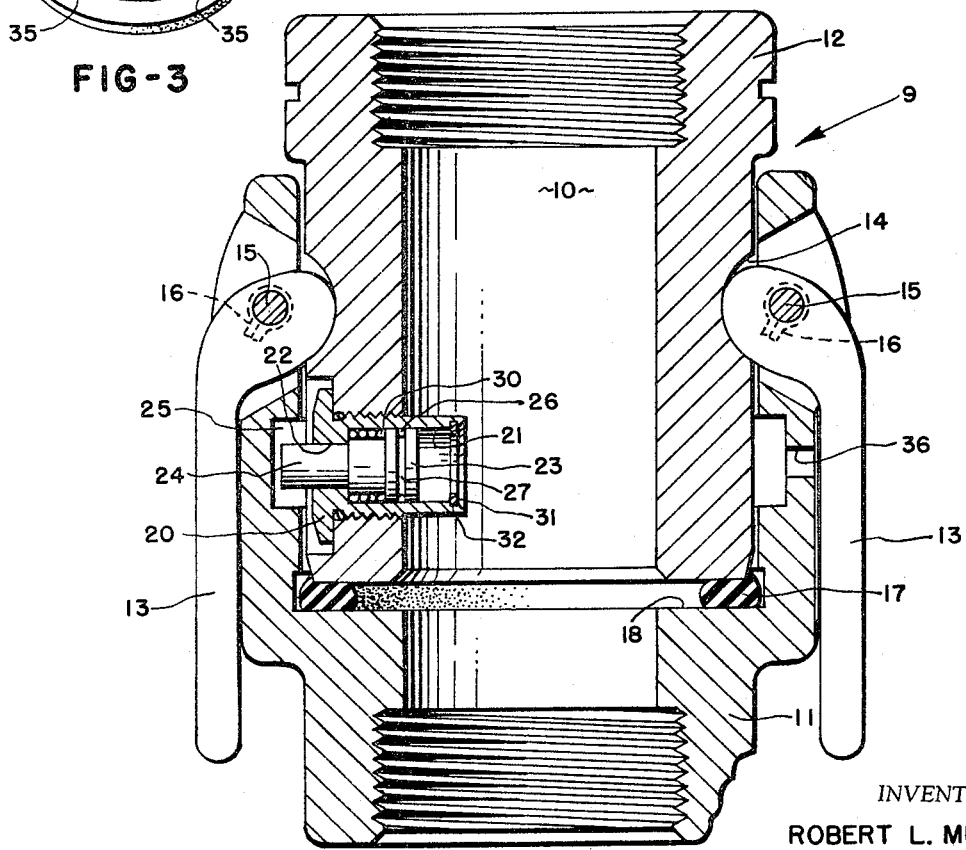
FIG-2
INVENTOR.
ROBERT L. MURRAY.
BY
Kinney & Schenk.
ATTORNEYS United States Patent Office 3,383,123
Patented May 14, 1968

3,383,123
LINE PRESSURE RESPONSIVE SAFETY COUPLING
Robert L. Murray, Dayton, Ky., assignor to Dover Corporation, Cincinnati, Ohio, a corporation of Delaware
Filed Oct. 23, 1965, Ser. No. 503,282
3 Claims. (Cl. 285—83)

ABSTRACT OF THE DISCLOSURE

The safety coupling and venting device for conduits carrying fluid under pressure comprises a tubular male member with a seating face at one end fitting into the hollow tubular portion of a hollow female member having a gasket supporting shoulder in sealing engagement with the seating face. The tubular portion has an inner annular groove and the male member has a hollow open ended cylindrical member traversing its wall in the plane of the groove. The cylindrical member carries spring biased piston urged radially outwardly by the fluid pressure in the male member. The piston carries a locking pin which is projected into the groove with its upper surface spaced from the upper wall of the groove a distance sufficient to allow the seating face to move upward out of sealing engagement with the gasket, and thus vent the pressure to a safe level.

---

This invention pertains to coupling devices and more particularly to a safe coupling device for fluid conduit means.

A serious problem with fluid coupling devices in current use is that it is possible for such devices to be uncoupled while high pressure fluid is contained therein. Such uncoupling of current devices containing pressurized fluid causes a whipping action of the loose coupling ends which can cause severe injury to personnel and damage to property. In those conduit systems where dangerous or flammable fluids are carried, the added hazard of inadvertent uncoupling is obvious.

Therefore, one feature of this invention is to provide a coupling device for fluid conduit means which cannot be uncoupled while high pressure fluid is contained therewithin.

Another feature of this invention is to provide a foolproof safety device for a fluid coupling which is self actuated without requiring any direct action on the part of an operator.

Another feature of this invention is to provide a reliable and foolproof safety device which is inexpensively produced and easily installed on a fluid coupling device.

Another feature of this invention is to provide a fluid coupling having a safety device which is completely automatic in operation and which cannot be overridden or independently operated from the exterior of such coupling but which can be uncoupled only when fluid pressure within such coupling reaches a safe level.

Another feature of this invention is to provide a safe fluid coupling device having cooperating coupling members which cannot be interchanged with coupling members of presently available fluid couplings.

Another feature of this invention is to provide a safe fluid coupling having cooperating coupling members which if unfastened with high pressure fluid contained therewithin cannot be fastened again until such pressure is reduced to a safe level.

Another feature of this invention is to provide seal means between cooperating coupling members of a safe fluid coupling in which such seal means permits fluid within such coupling to bleed out once such members have been unfastened.

Therefore, it is an object of this invention to provide a safe coupling device for fluid conduit means having one or more of the novel features of this invention as set forth above or hereinafter shown or described.

Other objects, uses, and advantages of this invention are apparent from a reading of this description, which proceeds with reference to the accompanying drawings forming a part thereof and wherein:

FIGURE 1 is an end view of the exemplary coupling device of this invention.

FIGURE 2 is a sectional view of the coupling device of this invention taken on the line 2—2 of FIGURE 1.

FIGURE 3 is a reduced size perspective view of a gasket used between the cooperating coupling members, particularly showing notches therein for bleeding fluid once such cooperating members have moved partially apart due to internal pressure.

While the various features of this invention are hereinafter illustrated and described as being particularly adaptable to a safe coupling device for fluid conduit means used in the liquefied petroleum gas industry, it is to be understood that the various features of this invention can be utilized singly or in any combination thereof to provide safe coupling devices for use with other fluids including both liquids and gases and combinations thereof.

Therefore, this invention is not to be limited to only the embodiments illustrated in the drawings, because the drawings are merely utilized to illustrate one of the wide variety of uses of this invention.

In the exemplary embodiment of this invention illustrated in FIGURES 1–3, an improved coupling device or coupling of the type used in a liquefied petroleum gas system is illustrated. Coupling 9 comprises a cooperating pair of members fastened together to provide chamber means or a coupling chamber shown at 10 for containing fluid under pressure therewithin. The cooperating members are generally fastened together by fastening means provided on such members. Safety means is provided to prevent such members from flying apart and causing damage, even with the fastening means inadvertently unfastened. The safety means is actuated by pressurized fluid from within such chamber means and assures such pair of members are held together until the pressure within the chamber means reaches a predetermined safe level. The safety means operates independently of any direct operator action being responsive only to the pressure within the chamber means and cannot be overriden or otherwise frustrated by an operator. The safe coupling device of this invention is inexpensive to produce and can be readily adapted to many industrial applications.

The fluid coupling device incorporating safety means illustrated in FIGURE 1 shows a plurality of three devices for keeping the pair of members in coupled relation. However, it will be appreciated that the number of devices employed can vary, with only one of such devices being completely adequate in many applications.

As shown more particularly in FIGURE 2, coupling device 9 comprises a female member or coupler 11 and a male member or adapter 12 cooperating within said female member to provide a coupling device which has coupling chamber means 10 therewithin.

Both coupler 11 and adapter 12 are generally right circular cylindrical in shape and the terminal end portion of adapter 12 is received in a cooperating receiving bore in an associated end portion of coupler 11.

Fastening means is provided for fastening and unfastening coupler 11 and adapter 12 and comprises lever means shown as a pair of oppositely arranged handles 13 pivotally fastened to coupler 11 and a cooperating annular groove 14 in adapter 12.

A pair of pivot pins, each designated by the numeral 15, are suitably fixed to opposite sides of coupler 11. Each pin 15 extends through a cooperating opening in an associated handle 13 and such handle pivots thereabout and is held onto its pin by any usitable means, such as a split snap ring 16 or the like. Each handle 13 has a cam contour adjacent its associated pin such that with the handle extending downwardly, as shown in FIGURE 2, a portion thereof projects beyond the inner circumferential surface of coupler 11 to engage groove 14 and fasten such coupler and adapter 12 together to form coupling device 9. With handles 13 extending upwardly, the previously projecting contour is rotated away from adapter 12 and groove 14 so that the adapter may be withdrawn.

Thus it is seen that fluid coupling 9 is uncoupled or unfastened by lifting handles 13 vertically toward adapter 12 to enable separation of such adapter and coupler 11. Coupling 9 is coupled or fastened together by inserting adapter 12 within the receiving bore of coupler 11 and lowering handles 13 against the coupler body.

With adapter 12 fastened within coupler 11, the terminal end of such adapter engages a gasket 17 carried on a shoulder 18 within coupler 11. Gasket 17 assures that the fluid carried within the coupling and conduit system does not leak out. While in this example gasket 17 is not shown as being held in position within coupler 11, it will be appreciated that such seal may be suitably held in some applications.

The safety means incorporated in the exemplary coupling device dsclosed herein keeps coupler 11 and adapter 12 coupled together even with handles 13 raised upwardly so as to unfasten coupling 9 from its normally fastened position. Such safety means is actuated by the pressurized fluid within chamber means 10, defined in this example by the overlapping portions of coupler 11 and adapter 12 until the pressure reaches a predetermined safe level.

Housing means shown as a plurality of generally right circular cylindrical housings, each designated by the numeral 20, are threaded into adapter 12. Each housing 20 is thus fixed to adapter 12 so that its axis is generally on a radial line extending from the axis of such adapter. As shown in FIGURE 1, each housing has one end extending within the cylindrical passage in adapter 12 and into chamber 10. The opposite end of each housing adjoins the outer cylindrical surface of adapter 12.

Bore means is provided in cylindrical adapter 12 and such bore means extends generally transverse the axis of such adapter. In this example, such bore means is provided in each housing 20 and extends coaxially therewith.

The bore means provided in each housing 20 comprises a right circular cylindrical piston receiving portion indicated by the numeral 21 communicating with chamber 10 and a right circular cylindrical rod receiving portion coaxial therewith and indicated by the numeral 22. Rod receiving portion 22 has a diameter smaller than the piston receiving portion 21 and communicates between the piston receiving portion and a surface of adapter 12 aligned immediately adjacent the coupled portion of adapter 12 and coupler 11. In this example the rod receiving portion extends to the outer surface of housing 20 adjoining the outer cylindrical surface of adapter 12.

A circular piston 23 having an integral elongated rod stem 24 of circular cross section is provided. Piston 23 and rod 24 have a common axis and the diameter of rod 24 is preferably smaller than the diameter of the piston 23 to correspond to the diameters of their associated bore portions or bores 22 and 21 respectively. Piston 23 is axially slidable back and forth within piston receiving bore 21 and integral rod or pin 24 is simultaneously axially slidable within rod receiving bore 22.

It will be apparent from FIGURE 2 that with bore 21 communicating with chamber 10 as shown, piston 23 is moved within such bore as a function of pressurized fluid acting thereagainst. Outward movement of piston 23 also causes integral rod 24 to move toward cooperating groove means in coupler 11 to provide a locking action.

The groove means in coupler 11 comprises an annular groove 25 extending completely around the circumference of coupler 11. Groove 25 has a generally rectangular sectional outline and is arranged in coupler 11 so that with the adapter 12 engaged against seal 17, groove 25 is directly opposite rod 24.

An O-ring seal 26 is provided in an annular groove 27 in piston 23. Seal 26 cooperates between piston 23 and piston receiving bore 21 and provides better control of the effective force exerted on piston 23 by pressurized fluid within chamber 10 by preventing fluid leakage past such seal.

Biasing means illustrated as a spring 30 is provided for biasing piston 23 and hence rod 24 into a retracted position toward the center of adapter 12 and, with the coupling 9 in the position shown in FIGURE 2, away from coupler 11. Spring 30 is illustrated as a coiled compression spring arranged concentrically about rod 24 and such spring acts between housing 20 and piston 23.

Stop means is provided for limiting the amount of inward travel of piston 23 toward the center of adapter 12. Piston 23 is limited in its outward travel by a shoulder at the inner end of bore 21. In this example, such stop means comprises a ring 31 which is held in a groove 32 located in the terminal inner end portion of housing 20. Ring 31 extends into bore 21 only a small amount sufficient to stop the inward movement of piston 23 without impairing fluid flow to such piston. Ring 31 is circumferentially compressed to reduce its diameter prior to insertion into its cooperating groove 32.

Having thus described the operating components of coupling 9, the operation thereof will be apparent. With handles 13 raised (with coupling 9 oriented as in FIGURE 2) vertically, adapter 12 is inserted within the cooperating receiving bore in coupler 11 and into engagement with seal 17. The handles 13 are then lowered to fasten such coupling for the handling therethrough of pressurized fluid. As the fluid pressure reaches a predetermined level, pressurized fluid within chamber 10 overrides spring 30 and the frictional drag of O-ring 26 thereby projecting rod 24 into groove 25. At this point even if handles 13 were raised vertically upwardly the adapter 12 and coupler 11 could not be taken apart, thus providing a self-actuated safety mechanism. The only way coupler 11 and adapter 12 can be operated is to reduce the pressure within chamber 10 to a safe level, which of course achieves the purpose of the safety device. It should be noted that none of the operating parts of the safety mechanism are accessible from the outside, thus making it impossible to override the safety action.

Groove 25 in this example has a generally rectangular sectional outline; however, it will be appreciated that the detailed configuration of such groove is not controlling. The width of groove 25 along the axis of adapter 12 is such that in the event coupling 9 is inadvertently unfastened, with pressurized fluid therewithin, rod 24 can move axially in groove 25 an amount sufficient to unseat the terminal end of adapter 12 from seal 17. This unseating enables fluid trapped in chamber 10 to bleed past seal 17 so rod 24 will be urged inwardly by spring 30 once the fluid flow system is shut down. The amount of squeeze placed on compressible gasket or O-ring seal 17 is not of itself controlling. In one industrial application of this invention a squeeze of .035 to .045 of an inch was used. It is only necessary that rod 24 travel slightly more than this amount within groove 25 along the axis of coupler 11 so that the above-mentioned bleeding can take place.

To assure that the desired bleeding past seal 17 is done in an effective manner, seal 17 has a plurality of notches therein illustrated in this example as four notches, each designated by the numeral 35 in FIGURE 3. The notches are preferably spaced at ninety degree intervals around the inner circumference of seal 17. Each notch extends radially into seal 17 only a part of the radial thickness; however, each notch is equal in height to the height of seal 17. Notches 35 are provided to eliminate any tendency of seal 17 to roll during separation of coupler 11 and adapter 12, which rolling might tend to continue the sealed condition. With the notches 35 in seal 17, bleeding from chamber 10 starts immediately upon separation of coupler 11 and adapter 12 and continues until pressure in chamber 10 reaches a safe level. It can be seen from the drawings that sufficient clearance is also provided between adapter 12 and coupler 11.

The position of groove 14 along adapter 12 is closely coordinated with the position of fastening levers 13 such that with groove 14 moved slightly out of position by axially retracting adapter 12, it is not possible to normally fasten coupling device 9 together again until the pressure within chamber 10 has been bled to a safe level.

The relative positioning of groove 14 with respect to arms 13 is different on a safe coupling from the corresponding positioning on a standard coupling to prevent interchangeability of coupling members.

In one of the model sizes of the coupling device of this invention in current use, a pressure of 5 pounds per square inch is considered safe, whereupon the spring 30 retracts piston 23 and hence rod 24 so that the adapter and coupler can be taken apart. Obviously, the pressure value which is considered safe will vary, depending on the fluid being carried within coupling 9.

Basically, it is only necessary that the force of spring 30 be sufficient to overcome the frictional drag of O-ring 26 to retract rod 24. However, in order to provide accurate control within coupling device 9, the construction of spring 30 may be varied so that the safety locking action may be provided at any desired pressure within chamber 10 and such pressure setting may be changed simply by changing springs. This feature makes a particular safe coupling device versatile and useable in other applications having different pressure requirements for safety.

The three housing 20 used in this example of the invention are preferably spaced apart at 120 degree intervals about the circumference of adapter 12, as shown in FIGURE 1. Such uniform spacing assures that coupler 11 and adapter 12 are held together in a manner providing maximum safety while preventing any tendency for the coupled members to skew and jam together in the event they are inadvertently uncoupled while containing pressurized fluid.

A single hole 36 is provided in the sidewall of coupler 11 for the purpose of manually moving rod 24 in the event it becomes stuck in a locked position.

Thus it is seen that a safe coupling device for fluid conduit means has been provided, which operates independently of any operator control while being inaccessibly positioned in such coupling and actuated as a function of pressurized fluid carried therewithin to keep such device from uncoupling until fluid pressure reaches a preset safe level.

While the form of the invention now preferred has been disclosed as required by the statutes, other forms may be used, all coming within the scope of the claims which follow.

What is claimed is:

1. In a separable coupling and venting device for fluid conduit means adapted to contain fluid under pressure comprising a tubular male member having a connection end and having a seating face on the opposite end thereof, an annular engageable surface formed on said member in spaced apart relation to said face, latch receiving means formed on said member in spaced apart relation to said annular engaging surface, a female member having a hollow tubular wall portion with a free open end and an internal shoulder therein adjacent its lower end, a gasket on said shoulder adapted to be engaged by said seating face, a latching device mounted on said wall portion, and engaging said latch receiving means on said male member for forcing said seating face into sealing engagement with said gasket and thereby effecting a fluid tight seal between said members, an annular peripheral groove on the inner face of said hollow wall, said groove having opposed upper and lower walls, an open ended cylinder traversing the wall of said tubular male member opposite said groove, piston operated rod means in said cylinder engageable in said grove, said piston being exposed for operation to fluid pressure in the male conduit, said rod having a diameter less than the axial distance between said walls of said groove resilient means engaging said piston means and biasing said piston means and said rod means away from said groove, a predetermined pressure in said conduit overriding said resilient means and causing said rod means to engage said groove, said rod means, when so engaged, being in spaced relation to the upper wall of the groove, a sufficient distance to allow said seating face to move upwardly out of sealing engagement with said gasket whereby upon release of said locking levers and thereby breaking said seal the rod means will contact the upper wall of the groove and permit venting of the pressure but prevent separation of the members until a safe pressure level is reached.

2. A separate coupling and venting device as defined in claim 1, wherein there is a groove on the outer surface of the male member, oppositely disposed pivotally mounted cam means mounted in the female member and in substantial registry with the groove in the male member, elongated handle means extending from each cam means, the handle means when moved being adapted to move each cam into or away from the groove in the male member to either respectively, connect the male and female members or to disconnect the male and female members.

3. A separate coupling and venting device as defined in claim 1, wherein there is a groove on the interior surface of the female coupler, a unitary housing means comprised of a cylinder portion and a piston portion mounted therein, the housing means having an opening at one end thereof through which extends a rod stem carried by the piston, spring means within the interior of the housing and biased so as to normally retract the piston in the cylinder and thus move the rod stem, the piston being adapted to receive pressure thereagainst from the adapter coupling member and move the piston so as to project the rod stem into the said groove within the interior of the female member to thus prevent axial displacement of one member of the coupler to be accidentally displaced with regard to the other member of the coupler.

References Cited

UNITED STATES PATENTS

| | | | |
|---|---|---|---|
| 1,706,051 | 3/1929 | Auchincloss | 220—55.3 |
| 2,245,847 | 6/1941 | Bagby | 285—83 |
| 2,591,531 | 4/1952 | Fishback | 285—306 X |
| 2,757,944 | 8/1956 | Krapp | 285—312 X |

CARL W. TOMLIN, *Primary Examiner.*

R. G. BERKLEY, *Assistant Examiner.*